US012343964B2

(12) United States Patent
Ackermann et al.

(10) Patent No.: US 12,343,964 B2
(45) Date of Patent: Jul. 1, 2025

(54) WATERPROOFING MEMBRANE WITH A SOLID FILLER COMPONENT

(71) Applicant: SIKA TECHNOLOGY AG, Baar (CH)

(72) Inventors: Herbert Ackermann, Tann (CH); Frank Hoefflin, Baden (CH); Roman Rohrer, Sarnen (CH); Lisa Gutjahr, Aschaffenburg (DE); Roy Z'Rotz, Ebikon (CH); Simon Schoenbrodt, Sarnen (CH)

(73) Assignee: SIKA TECHNOLOGY AG, Baar (CH)

( * ) Notice: Subject to any disclaimer, the term of this patent is extended or adjusted under 35 U.S.C. 154(b) by 499 days.

(21) Appl. No.: 17/354,293

(22) Filed: Jun. 22, 2021

(65) Prior Publication Data

US 2021/0308997 A1 Oct. 7, 2021

Related U.S. Application Data

(63) Continuation of application No. 16/061,968, filed as application No. PCT/EP2016/082003 on Dec. 20, 2016, now Pat. No. 11,065,849.

(30) Foreign Application Priority Data

Dec. 23, 2015 (EP) .................................... 15202469

(51) Int. Cl.

| | |
|---|---|
| ***B32B 27/08*** | (2006.01) |
| ***B32B 13/12*** | (2006.01) |
| ***B32B 25/14*** | (2006.01) |
| ***B32B 27/20*** | (2006.01) |
| ***B32B 27/28*** | (2006.01) |
| ***B32B 27/30*** | (2006.01) |
| ***B32B 27/32*** | (2006.01) |
| ***B32B 27/34*** | (2006.01) |

(52) U.S. Cl.

CPC .............. *B32B 27/08* (2013.01); *B32B 13/12* (2013.01); *B32B 25/14* (2013.01); *B32B 27/20* (2013.01); *B32B 27/283* (2013.01); *B32B 27/302* (2013.01); *B32B 27/304* (2013.01); *B32B 27/306* (2013.01); *B32B 27/32* (2013.01); *B32B 27/322* (2013.01); *B32B 27/34* (2013.01); *B32B 2250/02* (2013.01); *B32B 2264/10* (2013.01); *B32B 2274/00* (2013.01); *B32B 2307/31* (2013.01); *B32B 2307/538* (2013.01); *B32B 2307/54* (2013.01); *B32B 2307/558* (2013.01); *B32B 2307/582* (2013.01); *B32B 2307/7265* (2013.01); *B32B 2419/00* (2013.01); *B32B 2419/06* (2013.01)

(58) Field of Classification Search

None

See application file for complete search history.

(56) References Cited

U.S. PATENT DOCUMENTS

| | | |
|---|---|---|
| 5,759,570 A | 6/1998 | Arnold |
| 6,500,520 B1 | 12/2002 | Wiercinski et al. |
| 8,793,862 B2 | 8/2014 | Weber et al. |
| 2004/0182242 A1 | 9/2004 | Mitani et al. |
| 2005/0106967 A1 | 5/2005 | Suzuki |
| 2006/0115670 A1 | 6/2006 | Tanaka et al. |
| 2008/0190062 A1 | 8/2008 | Engbrecht et al. |
| 2010/0167047 A1 | 7/2010 | Ise et al. |
| 2013/0037989 A1 | 2/2013 | Wiercinski et al. |
| 2014/0272402 A1 | 9/2014 | Dubey et al. |
| 2015/0231863 A1 | 8/2015 | Knebel et al. |

FOREIGN PATENT DOCUMENTS

| | | | | |
|---|---|---|---|---|
| BE | 880572 A * | 4/1980 | | A61L 29/049 |
| CA | 3 009 255 A1 | 6/2017 | | |
| CN | 104583351 A | 4/2015 | | |
| EP | 0 420 924 B1 | 5/1996 | | |
| JP | 2001115791 A | 4/2001 | | |
| JP | 2008056783 A * | 3/2008 | | |
| WO | 02/14063 A1 | 2/2002 | | |
| WO | 2008/004520 A1 | 1/2008 | | |
| WO | 2008/100777 A2 | 8/2008 | | |
| WO | 2011/041263 A1 | 4/2011 | | |
| WO | 2011/094898 A1 | 8/2011 | | |
| WO | WO-2014029763 A1 * | 2/2014 | | B32B 27/065 |

OTHER PUBLICATIONS

Knebel et al., WO-2014029763, Feb. 27, 2014 (machine translation) (Year: 2014).*

Maeda et al., JP-2008056783-A, Mar. 13, 2008 (machine translation) (Year: 2008).*

Czuba et al., BE-880572-A, Apr. 1, 1980 (machine translation) (Year: 1980).*

Sep. 15, 2022 Office Action issued in Canadian Patent Application No. 3,004,984.

Mar. 16, 2017 International Search Report issued in International Patent Application No. PCT/EP2016/082003.

Mar. 16, 2017 Written Opinion issued in International Patent Application No. PCT/EP2016/082003.

"Kunststoff Verarbeitung"; by Schwarz, Ebeling and Furth; 10th Edition; 2005; Vogel Buchverlag; Chapters 3 and 5; pp. 23-28 and 59-60.

(Continued)

*Primary Examiner* — Cheng Yuan Huang

(74) *Attorney, Agent, or Firm* — Oliff PLC

(57) ABSTRACT

A membrane used in waterproofing and roofing applications, the membrane comprising a barrier layer comprising a thermoplastic polymer component and a contact layer bonded to at least portion of the barrier layer, the contact layer comprising a mixture of a solid filler component and a thermoplastic polymer component. The disclosure is also directed to a method for producing the membrane, a method for waterproofing a substrate, a waterproofed construction, a method for sealing a substrate against water penetration, and a sealed construction for sealing a substrate against water penetration.

21 Claims, 1 Drawing Sheet

(56) References Cited

OTHER PUBLICATIONS

Jun. 5, 2020 Office Action issued in Australian Patent Application No. 2016378275.

Jul. 3, 2020 Office Action issued in Indonesian Patent Application No. P00201804643.

Hirasawa, Eisaku, JP2001115791A, Waterproof sheet for tunnel, Apr. 24, 2001 (Machine translation) (Year: 2001).

Polymer Properties Database, Melting points of polymers, 2015-2020 <http://polymerdatabase.com/polymer%20physics/Polymer%20Tm%20C.html> (Year: 2015).

* cited by examiner

S1

S2

WATERPROOFING MEMBRANE WITH A SOLID FILLER COMPONENT

CROSS-REFERENCE TO RELATED APPLICATIONS

This is a Continuation of application Ser. No. 16/061,968, now U.S. Pat. No. 11,065,849 filed Jun. 13, 2018, which in turn is allowed and is a National Stage Entry of PCT/EP2016/082003 filed Dec. 20, 2016, which claims priority to EP 15202469.1 filed Dec. 23, 2015. The disclosure of each of the prior applications is hereby incorporated by reference herein in its entirety.

TECHNICAL FIELD

The invention relates to waterproofing membranes for use in the construction industry, for example for basements, roofing and tunneling applications to protect concrete structures against water penetration.

BACKGROUND ART

Waterproofing membranes are commonly used in the construction industry for sealing bases, underground surfaces or buildings against water penetration.

State-of-the-art waterproofing membranes are multilayer systems comprising a polymer-based barrier layer as the principal layer to provide watertightness. Typical polymers used in barrier layers include thermoplastics such as plasticized polyvinylchloride (p-PVC) and thermoplastic polyolefins (TPO) or elastomers such as ethylene-propylene diene monomer (EPDM) and crosslinked chlorosulfonated polyethylene (CSPE). One of the drawbacks of polymer-based barrier layers is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to provide sufficient bonding of the polymer-based barrier layer and the structure to be waterproofed.

In waterproofing applications, the membrane is typically post-applied to an existing concrete structure. In this case the membrane is bonded with an adhesive or a sealing tape via its contact layer to the surface of the concrete structure to be waterproofed. In pre-applied waterproofing applications, however, the membrane is laid out before the concrete structure to be waterproofed is built. In this case, the membrane is placed with its barrier layer against an underlying structure or formwork and fresh concrete is then cast against the surface of the contact layer, thereby fully and permanently bonding the membrane to the surface of the hardening concrete.

In pre-applied waterproofing applications, typically an adhesive is used, to bond the barrier layer to the contact layer and to the fresh concrete cast against the contact layer. The adhesive should also enable the fresh concrete to penetrate deeply into to contact layer before hardening in order to provide high resistance to penetrating water.

One of the main challenges related to the multilayer waterproofing membranes is to ensure watertightness after infiltration in case of leak in the barrier layer.

Watertightness after infiltration means in general that the sealing construction should be able to prevent the infiltrated water from penetrating to the space between the membrane and the waterproofed surface. A leak in the barrier layer can be a result of inward growing tree roots, material failure or tensile or shear forces directed to the membrane. If the watertightness after infiltration is lost, water is able to flow laterally underneath the membrane and to invade the interior of the building structure. In such cases the exact location of the leak in the barrier layer is also difficult to detect.

U.S. Pat. No. 8,793,862B2 describes a waterproofing membrane comprising a barrier layer, a composite layer arranged on one side of the barrier layer and a network of sealant between the barrier layer and the composite layer. The network of sealant is said to limit the size of area affected by penetrating water in case of water leakage in the barrier layer. In waterproofing applications the membrane is applied on a subsurface in such way that the barrier layer is directed against a concrete base and the composite layer is facing the concrete casted against the membrane. During the hardening process, the composite layer is penetrated by the liquid concrete forming a good bond with the hardened concrete.

US2015/0231863A1 discloses a waterproofing membrane including a barrier layer and a functional layer including a thermoplastic polymer that changes consistency under influence of highly alkaline media and an adhesive. Once the functional layer gets into contact with liquid concrete, the thermoplastic polymer dissolves and allows the adhesive to bond to the cast concrete. The functional layer may additionally comprise other thermoplastic polymers, fillers or concrete constituents. The construction of the functional layer is said to enable working with membranes in adverse weather conditions without diminishing the adhesive capacity of the membrane.

One disadvantage of state-of-the-art multilayer waterproofing membranes is related to the use of adhesives, which increases the complexity of the membrane build-up and consequently the production costs of such membranes. The adhesive has to provide good binding to the low surface energy polymers in the barrier layers, form a strong bond to the contact layer and to fresh concrete and have a good resistance to varying temperature ranges, UV irradiation and oxidation. Adhesives fulfilling all the requirements, if available at all, are expensive and thus increase the production cost of such membranes by a significant amount.

Another disadvantage of state-of-the-art multilayer waterproofing membranes is related to the use of fleece backings as contact layer to provide sufficient bonding between the membrane and the substrate to be waterproofed. In waterproofing and roofing applications the adjacent membrane sheets have to be homogenously joined to each other in a reliable way to ensure watertightness of the sealing construction. Membranes having a fleece backing cannot be joined by heat welding but instead the edges of the membranes have to be bonded together either with an adhesive or with a sealing tape adhered on top of the seam and/or under the seam. The use of an adhesive or a sealing tape to join adjacent membrane sheets complicates the installation process and increases application costs.

SUMMARY OF THE INVENTION

The objective of the present invention is to provide a simplified membrane, which can be used to protect surfaces against water penetration, for example in basement waterproofing, roofing and tunneling applications, and which fully and permanently bonds to concrete and other cementitious compositions cast onto the membrane after hardening, as well as to adhesives commonly used in the construction industry.

Another objective of the present invention is to provide a membrane, which retains watertightness after infiltration in case of a leaking barrier layer.

Still another objective of the present invention is to provide a membrane, which has good heat welding properties and good stability against mechanical stresses.

According to the invention, the aforementioned objectives are achieved with the membrane according to claim 1.

The main concept of the invention is that the membrane comprises a thermoplastic barrier layer and a contact layer bonded to at least a portion of the barrier layer, wherein the contact layer comprises a mixture of a solid filler component and a thermoplastic polymer component. The properties of the contact layer enable the membrane to be fully bonded to cementitious compositions after hardening as well as to adhesives commonly used in the construction industry.

One of the advantages of the membrane is its simple build-up, which enables lower production costs compared to state-of-the-art membranes while still providing full and permanent bonding to cementitious compositions and watertightness after infiltration.

Another advantage of the present invention is that the membrane has good heat welding properties, which means that adjacent membranes can be homogeneously joined by heat welding instead of using an adhesive or a sealing tape to bond overlapping membrane sheets.

In another aspect of the present invention there is provided a method for producing a membrane of the present invention, a method for waterproofing a substrate, a waterproofed construction, a method for sealing a substrate and a sealed arrangement.

DETAILED DESCRIPTION OF THE INVENTION

Figures 1, 2:
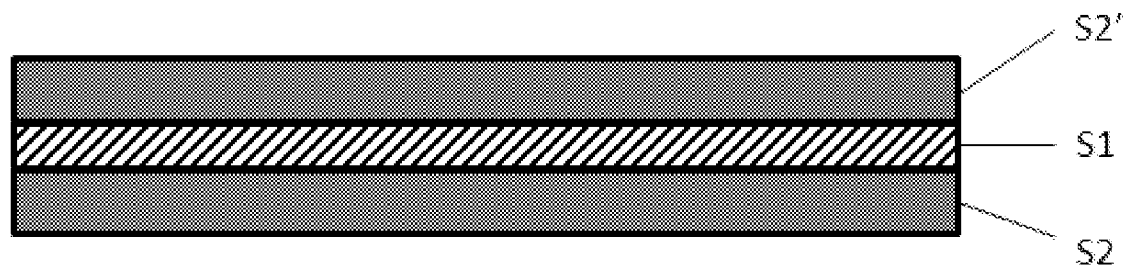
FIG. 1 shows a cross-section of a membrane having a barrier layer and a contact layer
FIG. 2 shows a cross-section of a membrane of the present invention having a barrier layer and two contact layers

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "polymer component" designates polymer compositions comprising one or more polymers.

The term "inert mineral fillers" designates mineral fillers that are not chemically reactive. They are produced from natural mineral sources by mining followed by comminution to required particle size and shape. In particular, inert mineral fillers include sand, calcium carbonate, crystalline silicas, dolomite, clay, talc, mica, Wollastonite, barite, perlite, diatomaceous earth, pumice, and vermiculite.

By calcium carbonate as mineral filler is understood in the present document calcitic fillers produced from chalk, limestone or marble by grinding and/or precipitation.

The term "sand" designates mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%.

The term "mineral binder" designates a binder, which in the presence of water reacts in a hydration reaction under formation of solid hydrates or hydrate phases. In particular, the term "mineral binder" refers to non-hydrated mineral binders, i.e. mineral binders, which have not been mixed with water and reacted in a hydration reaction.

The term "hydraulic binder" designates substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "gypsum" designates any known form of gypsum, in particular calcium sulfate dehydrate, calcium sulfate a-hemihydrate, calcium sulfate B-hemihydrate, or calcium sulfate anhydrite or mixtures thereof.

The term "latent hydraulic binders" designates particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

The term "cement" designates ground hydraulic binders, which apart from the hydraulic binders as the main constituents, usually contain small quantities of calcium sulfate (gypsum and/or hemihydrate and/or anhydrite), and optionally secondary constituents and/or cement additives such as grinding aids. The main constituents are contained in quantities of more than 5% by weight. The main constituents can be Portland cement clinker, also referred to as clinker or cement clinker, slag sand, natural or artificial pozzolans, fly ash, for example, siliceous or calcareous fly ash, burnt shale, limestone and/or silica fume. As secondary constituents, the cements can contain up to 5% by weight of finely divided inorganic, mineral substances, which originate from clinker production.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition.

The term "fresh cementitious composition" or "liquid cementitious composition" designate cementitious compositions before hardening, particularly before setting.

The present invention relates in a first aspect to a membrane comprising a barrier layer S1 having a first and a second opposing surface and a contact layer S2 having a first and a second opposing surface, wherein at least a portion of the first surface of the barrier layer S1 and the second surface of the contact layer S2 are directly bonded to each other, and wherein the barrier layer S1 comprises a thermoplastic polymer component P1 and the contact layer S2 comprises a mixture of a solid filler component F and a thermoplastic polymer component P2.

The barrier layer S1 and the contact layer S2 are typically sheet-like elements having first and second surfaces defined by peripheral edges. The second surface of the contact layer can be bonded to at least a portion of first surface of the barrier layer or across the entire first surface of the barrier layer. Preferably the second surface of the contact layer is bonded across the entire surface of the barrier layer.

One embodiment of the membrane of the present invention is shown in FIG. 1, which shows a cross-section of a membrane consisting of a barrier layer S1 having a first and a second opposing surface and a contact layer S2 having a first and a second opposing surface, which is bonded to at least a portion of the first surface of the barrier layer S1.

The first surface of the barrier layer S1 is directly bonded to the second surface of the contact layer S2. The expression "directly bonded" is understood to mean that no further layer or substance is present between the layers, and that the two layers are directly bonded to each other or adhere to each other. At the transition area between the two layers, the materials forming the layers can also be present mixed with each other.

Preferably, the thermoplastic polymer component P2 has a melting point of 25-250° C., preferably 55-225° C., more preferably 60-200° C., most preferably 65-150° C. Contact layers with the melting point of the thermoplastic polymer component P2 in the above mentioned ranges were found to provide particularly good concrete adhesion strengths.

The term "melting point" refers to the maximum of the curve determined according to ISO 11357 standard by means of dynamic differential calorimetry (DSC). At the melting point the material undergoes transition from the solid to the liquid state. The measurement can be performed with a Mettler Toledo 822e device at a heating rate of 2 degrees centigrade/min. The melting point values can be determined from the measured DSC curve with the help of the DSC software.

The solid filler component F is preferably dispersed throughout, preferably uniformly, the thermoplastic polymer component P2 in the contact layer S2 to ensure that the properties of the contact layer do not change considerably along the length of the membrane.

The solid filler component F is preferably present in the contact layer S2 as a discontinuous particle based phase, which is dispersed in a continuous phase of the thermoplastic polymer component P2.

The amount of the solid filler component F in the contact layer S2 should be high enough to enable sufficient strength of adhesion by which the contact layer is bonded to cementitious compositions. On the other hand, increasing the amount of the solid filler component F also increases the stiffness of the contact layer, which may make the membrane unsuitable for certain sealing applications.

The amount of the solid filler component F can be 10.0-90.0 wt.-% based on the total weight of the contact layer S2. Preferably, the amount of the solid filler component F is 15.0-80.0 wt.-%, more preferably 20.0-75.0 wt.-%, most preferably 25.0-70.00 wt.-%, based on the total weight of the contact layer S2. Particularly, the amount of the solid filler component F is 30.0-70.0 wt.-%, preferably 35.0-70.0 wt.-%, most preferably 35.0-65.0 wt.-%, based on the total weight of the contact layer S2.

In waterproofing applications, one of the most important characteristics of a membrane is the strength of adhesion by which the membrane is bonded to the substrate, for example a concrete surface, to be sealed against water penetration. In case the strength of adhesion is too low, gaps are more easily formed between the membrane and the surface of the substrate, which may lead to loss of watertightness after infiltration.

Preferably, the membrane has concrete adhesion strength of at least 5 N/50 mm, more preferably at least 10 N/50 mm, even more preferably of at least 15 N/50 mm, even more preferably of at least 20 N/50 mm, most preferably of at least 30 N/50 mm. In particular, the membrane has concrete adhesion strength of at least 40 N/50 mm, preferably of at least 45 N/50 mm, more preferably of at least 50 N/50 mm, even more preferably of at least 55 N/50 mm, most preferably of at least 60 N/50 mm.

Preferably, the membrane has concrete adhesion strength in the range of 10-400 N/50 mm, more preferably of 15-350 N/50 mm, even more preferably of 20-300 N/50 mm, most preferably of 30-250 N/50 mm.

The term "concrete adhesion strength of a membrane" refers to the average peel resistance [N/mm]per unit width of the membrane upon peeling the membrane from a surface of a concrete specimen, which has been casted on the surface of the contact layer and hardened for 28 days under standard atmosphere (air temperature 23° C., relative air humidity 50%).

In the context of the present invention, the concrete adhesion strength of a membrane is determined using the measurement method described below.

Method for Determining the Concrete Adhesion Strength of a Membrane

For the measurement of the average peel resistance, a concrete test specimen having a sample of the test membrane adhered on its surface is first prepared.

A sample membrane with a dimension of 200 mm (length)×50 mm (width) is first cut from the test membrane. One edge of the sample membrane on the side of the contact layer is covered with an adhesive tape having a length of 50 mm and a width coinciding with the width of the sample membrane to prevent the adhesion to the hardened concrete. The adhesive tapes are used to provide easier installation of the concrete test specimens to the peel resistance testing apparatus. The sample membrane is placed into a formwork having a dimension of 200 mm (length)×50 mm (width)×30 mm (height) with the contact layer of the sample membrane facing upwards and the barrier layer against the bottom of the formwork.

For the preparation of the concrete specimen, a fresh concrete formulation is prepared by mixing 92.06 wt.-% of a concrete dry batch of type MC 0.45 with 7.73 wt.-% of water and 0.21 wt.-% of Sikament-12S for five minutes in a tumbling mixer. The concrete dry batch of type MC 0.45 contains 17.21 wt.-% of CEM I 42.5 N cement (preferably Normo 4, Holcim) and 74.84 wt.-% of aggregates containing 3.0 wt.-% of Nekafill-15 (from KFN) concrete additive (limestone filler), 24.0 wt.-% of sand having a particle size of 0-1 mm, 36.0 wt.-% of sand having a particle size of 1-4 mm, and 37 wt.-% of gravel having a particle size of 4-8 mm. Before blending with water and Sikament-12S the concrete dry batch is homogenized for five minutes in a tumbling mixer.

The formwork containing the sample membrane is subsequently filled with the fresh concrete formulation and vibrated for two minutes to release the entrapped air. After hardening for one day the concrete specimen is stripped from the formwork and stored under standard atmosphere (air temperature 23° C., relative air humidity 50%) for 28 days before measuring the average peel resistance.

The average peel resistance upon peeling the sample membrane from the surface of the concrete specimen is measured using a Zwick Roell AllroundLine Z010 material testing apparatus equipped with a Zwick Roell 90°-peeling device or using a similar testing apparatus fulfilling the requirements of the DIN EN 1372 standard.

In the peel resistance measurement, the concrete specimen is clamped with the upper grip of the material testing apparatus for a length of 10 mm at the end of the concrete specimen comprising the taped section of the sample membrane. Following, the sample membrane is peeled off from the surface of the concrete specimen at a peeling angle of 90° and at a constant cross beam speed of 100±10 mm/min. During the peel resistance measurement the distance of the rolls is preferably approximately 570 mm. The peeling of the sample membrane is continued until a length of approximately 140 mm of the sample membrane is peeled off from the surface of the concrete specimen. The average peel resistance is calculated as average peel force per unit width of the membrane [N/50 mm]during peeling over a length of approximately 70 mm thus excluding the first and last quarter of the total peeling length from the calculation.

The solid filler component F is preferably selected from the group consisting of organic fillers, inert mineral fillers and mineral binders and mixtures thereof. More preferably the solid filler component F is selected from the group consisting of inert mineral fillers and mineral binders and mixtures thereof.

In one embodiment the solid filler component F is inert mineral filler. The inert mineral filler is preferably selected from the group consisting of sand, calcium carbonate, crystalline silicas, and talc, and mixtures thereof.

Preferably, the solid filler component F comprises at least one mineral binder selected from the group consisting of hydraulic, non-hydraulic, latent hydraulic, pozzolanic binders, and mixtures thereof. The solid filler component F can further comprise inert mineral fillers such sand, calcium carbonate, crystalline silicas or talc. Preferably the solid filler component F contains at least 60.0 wt.-%, more preferably at least 70.0 wt.-%, even more preferably at least 80.0 wt.-%, most preferably at least 90.0 wt.-% of mineral binders.

The solid filler component F preferably comprises a hydraulic binder, in particular cement or cement clinker. The solid filler component F can further comprise latent hydraulic and/or pozzolanic binders, preferably slag and/or fly ash. In one advantageous embodiment, the solid filler component F contains 5.0-50.0 wt.-%, preferably 5.0-40.0 wt.-%, more preferably 5.0-30.0 wt.-% of latent hydraulic and/or pozzolanic binders, preferably slag and/or fly ash and at least 35.0 wt.-%, more preferably at least 65.0 wt.-% of hydraulic binder, preferably cement or cement clinker.

Preferably, the solid filler component F is a hydraulic binder, preferably cement.

The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

The solid filler component F is preferably in the form of finely divided particles, in order to obtain a contact layer with uniform surface properties. The term "finely divided particles" refers to particles, whose median particle size $d_{50}$ does not exceed 500 μm. The term median particle size $d_{50}$ refers to a particle size below which 50% of all particles by volume are smaller than the $d_{50}$ value.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably the median particle size $d_{50}$ of the solid filler component F is 1.0-300.0 μm, more preferably 1.5-250.0 μm, even more preferably 2.0-200.0 μm, most preferably 2.0-150.0 μm.

Preferably, less than 40 wt-%, more preferably less than 30 wt.-%, even more preferably less than 20-wt.-%, most preferably less than 10 wt.-% of the particles of the solid filler component F have a particle size of less than 5 μm and preferably less than 40 wt.-%, more preferably less than 30 wt.-%, even more preferably less than 20-wt.-%, most preferably less than 10 wt.-% of the particles of the solid filler component F have a particle size of above 100 μm.

Preferably, the overall particle size of the solid filler component F (of at least 98 percent of the particles) is below 250 μm, more preferably below 200 μm, even more preferably below 100 μm.

Increasing the amount of the thermoplastic polymer component P2 in the contact layer S2 improves the strength of adhesion between the barrier layer S1 and the contact layer S2. However, increasing the amount of the thermoplastic polymer component P2 over a certain limit tends to also decrease the concrete adhesion strength of the membrane.

Preferably, the amount of the thermoplastic polymer component P2 is 10.0-90.0 wt.-%, preferably 15.0-80.0 wt.-%, more preferably 20.0-75.0 wt.-%, most preferably 25.0-70.0 wt.-%, based on the total weight of the contact layer S2. Particularly, the amount of the thermoplastic polymer component P2 is 30.0-70.0 wt.-%, preferably 35.0-70.0 wt.-%, most preferably 35.0-65.0 wt.-%, based on the total weight of the contact layer S2.

Any kind of thermoplastic polymer component is in principle suitable to be used in the contact layer S2. Preferably, the thermoplastic polymer component P2 comprises at least one polymer selected from the group consisting of ethylene-vinyl acetate copolymer (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

Preferably the thermoplastic polymer component P2 comprises at least one polymer selected from the group consisting of low-density polyethylene, linear low-density polyethylene, high-density polyethylene, ethylene-vinyl acetate copolymer, ethylene-acrylic ester copolymers, ethylene-α-olefin co-polymers, and ethylene-propylene co-polymers.

The thermoplastic polymer component P may have a Young's modulus measured according to ISO 527-3 standard at a temperature of 23° C. of not more than 1000 MPa, more preferably not more than 750 MPa, even more preferably not more than 500 MPa, most preferably not more than 450 MPa. In particular, the thermoplastic component P may have a Young's modulus measured according to ISO 527-3 standard at a temperature of 23° C. in the range from 50 to 1000 MPa, preferably from 50 to 750 MPa, more preferably from 100 to 750 MPa, most preferably from 100 to 700 MPa. Contact layers containing a thermoplastic polymer component P having a Young's modulus at the above mentioned ranges were found to provide good concrete adhesion strengths.

Preferably, the thermoplastic polymer component P2 has a Young's modulus measured according to ISO 527-3 standard at a temperature of 23° C. of less than 150 MPa, more preferably less than 100 MPa, most preferably less than 50 MPa. Contact layers with the thermoplastic polymer component P2 having a Young's modulus at the above mentioned ranges were found to provide particularly high concrete adhesion strengths.

The properties of the membrane were found especially suitable when the thermoplastic polymer component P2 comprises at least one ethylene-vinyl acetate copolymer, preferably having a content of a structural unit derived from vinyl acetate (hereinafter referred to as "vinyl acetate unit") of at least 7.0 wt.-%, more preferably at least 30 wt.-%, even more preferably at least 35 wt.-%, most preferably at least 40 wt.-%.

Preferably, the at least one ethylene-vinyl acetate copolymer has a content of vinyl acetate unit in the range from 7.0 wt.-% to 90.0 wt.-%, more preferably from 7.0 to 80.0 wt.-%, most preferably from 7.0 to 70.0 wt.-%.

Preferably, the amount of the at least one ethylene-vinyl acetate co-polymer is at least 5.0 wt.-%, more preferably at least 10.0 wt.-%, most preferably at least 15.0 wt.-%, based on the total weight of the thermoplastic polymer component P2. In particular, the amount of the at least one ethylene-vinyl acetate co-polymer is in the range from 5.0 wt.-% to 90.0 wt.-%, preferably from 10.0 to 90.0 wt.-%, more preferably from 15.0 to 80 wt.-%, most preferably from 15.0 to 70.0 wt.-%.

The amount of the at least one ethylene-vinyl acetate co-polymer, preferably having a content of vinyl acetate unit of at least 7.0 wt.-%, more preferably at least 20.0 wt.-%, is preferably at least 30.0 wt.-%, more preferably at least 35.0 wt.-%, even more preferably at least 40.0 wt.-%, most preferably at least 50.0 wt.-%, based on the total amount of the at least on thermoplastic polymer component P2.

The glass transition temperature ($T_g$) of the thermoplastic polymer component P2 is preferably below the temperatures occurring during the use of the contact layer. It is therefore preferred that the $T_g$ of the thermoplastic polymer component P2 is below 0° C., more preferably below −15° C., most preferably below −30° C.

The term "glass transition temperature" refers to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

Typically, the contact layer S2 contains only small amounts of water before it is contacted with a fresh cementitious composition., Preferably, the amount of water in the contact layer S2 is less than 5.0 wt.-%, preferably less than 3.0 wt.-%, even more preferably less than 1.5 wt.-%, based on the total weight of the contact layer S2. In particular, the amount of water in the contact layer S2 is less than 2.0 wt.-%, preferably less than 1.0 wt.-%, even more preferably less than 0.5 wt.-%, based on the total weight of the contact layer S2.

In case the solid filler component comprises or consists of mineral binders, the mineral binders should remain in substantially non-hydrated state at least until the contact layer is contacted with a composition containing water, such as fresh cementitious composition. Hydration of the mineral binder particles contained in the contact layer would decrease the flexibility and thus deteriorate the handling properties of the membrane. It would also affect negatively the concrete adhesion strength of the membrane. It has been found that the mineral binders contained in the contact layer remain in substantially non-hydrated if the membrane is stored for several weeks at normal room temperature and relative humidity of 50%.

The contact layer S2 may comprise not more than 10.0 wt.-%, preferably not more than 5.0 wt.-% of hydrated mineral binders, based on the total weight of the contact layer S2. Preferably, the contact layer S2 comprises not more than 2.5 wt.-%, more preferably not more than 1.0 wt.-%, even more preferably not more than 0.5 wt.-%, most preferably not more than 0.1 wt.-% of hydrated mineral binders, based on the total weight of the contact layer S2.

In order to produce a contact layer S2 containing non-hydrated mineral binders, the solid filler component F containing the mineral binder is preferably mixed with the thermoplastic polymer component P2 in dry form, i.e. without being mixed with water. Mixing the mineral binder with water would result in initiation of the hydration reactions, which is not desired. The contact layer S2 is preferably obtained by melt-processing a composition containing the solid filler component F and the thermoplastic polymer component P2 to a homogenized melt, which is then extruded through a manifold or a flat die followed by cooling the extruded material between calender cooling rolls.

The homogenized melt is preferably obtained by melt-processing a composition comprising the solid filler component F and the thermoplastic polymer component P2 at a temperature, which is above the melting point of point of the thermoplastic polymer component P2. Preferably, the homogenized melt is substantially free of water. In particular, the amount of water in the homogenized melt is less than 5.0 wt.-%, preferably less than 2.5 wt.-%, more preferably less than 1.0 wt.-%, even more preferably less than 0.5 wt.-%, most preferably less than 0.1 wt.-%, based on the total weight of the homogenized melt.

The second surface of the contact layer S2 is preferably non-tacky at normal room temperature (25° C.). Whether a surface of a specimen is tacky or not can be determined by pressing the surface with the thumb at a pressure of about 5 kg for 1 second and then trying to lift the specimen by raising the hand. In case the thumb does not remain adhered to the surface and the specimen cannot be raised up, the surface is considered to be non-tacky. In the context of membrane of the present invention, the "specimen" used in the tackiness test refers to a membrane having width of 10 cm and length of 20 cm.

Non-tackiness of the second surface of the contact layer S2 enables to produce membranes without release tapes (different surfaces of the membrane do not adhere to each), which would have to be removed and disposed of at the job site.

Preferably, the thermoplastic polymer component P1 is miscible with the thermoplastic polymer component P2.

More preferably, the thermoplastic polymer component P1 is weldable with the thermoplastic polymer component P2. The polymer components being "weldable" with each other means here that a thermoplastic layer consisting of the thermoplastic polymer component P1 can be homogenously joined by heat welding with another thermoplastic layer consisting of the at least thermoplastic component P2.

According to one embodiment, the thermoplastic polymer component P1 and the thermoplastic polymer component P2 comprise at least common polymer. The thermoplastic polymer component P1 and the thermoplastic polymer component P2 can have the same composition.

The contact layer S2 can comprise, in addition to the solid filler component F and the thermoplastic polymer component P2 additives such as UV- and heat stabilizers, plasticizers, foaming agents, dyes, colorants, pigments, matting agents, antistatic agents, impact modifiers, flame retardants, and processing aids such as lubricants, slip agents, antiblock agents, and denest aids.

It was surprisingly found that the concrete adhesion strength of a membrane depends at least partly on the surface roughness of the contact layer S2. The term "roughness" designates unevenness of a surface, which is quantified with three-dimensional (3D) surface roughness parameters defined according to ISO 25178 standard. The 3D-surface roughness parameters are calculated based on a surface geometry determined with an optical measurement method.

The following 3D-surface roughness parameters defined according to ISO 25178 standard for the first surface of a contact layer S2 were found to correlate with the concrete adhesion strength of the membrane: root mean square roughness (Sq), average roughness (Sa), and maximum height of the surface (Sz).

The average roughness (Sa) and the root mean square roughness (Sq) represent an overall measure of the unevenness of the surface. They are relatively insensitive in differentiating peaks, valleys, and the spacing of the various texture features.

Maximum height of the surface (Sz) is calculated as difference between maximum peak height (Sp) and maximum valley depth (Sv). The maximum peak is the height of the highest point and maximum valley depth is the depth of the lowest point of the surface.

In the context of the present invention, the root mean square roughness (Sq), the average roughness (Sa), and the maximum height of the surface (Sz) for the surface of a contact layer S2 are determined using the measurement method described below.

Method for Determining the 3D-Surface Roughness Parameters for a Surface

In determination of the 3D-surface roughness parameters, the surface geometry of the surface is first measured.

For measuring of the surface geometry, a sample sheet, preferably with a size of 100 mm (length)×100 mm (width), is adhered with the surface to be measured facing upwards to an aluminum sheet, preferably having a dimension of 100 mm (length)×100 mm (width)×5 mm (height), to ensure a completely planar lying of the sample sheet. A double-sided adhesive tape can be used in attaching the sample sheet to the aluminum sheet.

The surface geometry of the surface is measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 $cm^2$ in the x-y-direction. In conducting the surface geometry measurements, the top and bottom limit of confocal acquisition in z-direction is preferably adjusted manually in the laser modus after adjusting the coarse and fine focus in the live color image modus.

The 3D-surface roughness parameters for the surface are then calculated based on the measured surface geometry with the Olympus LEXT OLS4000 Application Version 2.1.3 software. The 3D-surface roughness parameters are calculated using unfiltered primary dataset obtained from the optical measurements. By "unfiltered data set" is meant that the dataset has not been adapted by using any of the filters characterized by the cutoff lengths $\lambda_s$, $\lambda_c$, or $\lambda_f$.

Preferably, the first surface of the contact layer S2 has a 3D-root mean square roughness (Sq) according to EN ISO 25178 of at least 1.0 μm, preferably of at least 2.0 μm, more preferably of at least 4.0 μm, even more preferably of at least 10.0 μm, most preferably of at least 15.0 μm.

Particularly, the 3D-root mean square roughness (Sq) according to EN ISO 25178 of the first surface of the contact layer S2 is preferably in the range of 10.0-500.0 μm, more preferably 15.0-400.0 μm, even more preferably 20.0-300.0 μm, and most preferably 25.0-250.0 μm. Particularly preferably the 3D-root mean square roughness (Sq) according to EN ISO 25178 of the first surface of the contact layer S2 is in the range of 10.0-300.0 μm, more preferably 15.0-250.0 μm, even more preferably 20.0-200.0 μm, most preferably 30.0-200.0 μm.

Membranes having a 3D-root mean square roughness (Sq) of the first surface of the contact layer S2 in the aforementioned range were found to have particularly good concrete adhesion strength.

Preferably, the first surface of the contact layer S2 has 3D-average roughness (Sa) according to EN ISO 25178 of at least 10.0 μm, preferably at least 15.0 μm, more preferably at least 20.0 μm, and most preferably at least 25.0 μm.

Particularly, the 3D-average roughness (Sa) according to EN ISO 25178 of the first surface of the contact layer S2 is preferably in the range of 10.0-500.0 μm, more preferably 15.0-400.0 μm, even more preferably 20.0-300.0 μm, and most preferably 25.0-250.0 μm. Particularly preferably the 3D-average roughness (Sa) according to EN ISO 25178 of the first surface of the contact layer S2 is in the range of 15.0-300.0 μm, more preferably 20.0-250.0 μm, even more preferably 25.0-200.0 μm, and most preferably 30.0-200.0

μm Membranes having a 3D-average roughness (Sa) of the first surface of the contact layer S2 in the aforementioned range were found to have particularly good concrete adhesion strength.

Preferably, the first surface of the contact layer S2 has 3D-maximum surface height (Sz) according to EN ISO 25178 of at least 100.0 μm, more preferably of at least 125.0 μm, even more preferably of at least 150.0 μm, most preferably of at least 200.0 μm.

Membranes having a 3D-maximum surface height (Sz) of the first surface of the contact layer S2 in the aforementioned ranges were found to have particularly good concrete adhesion strength.

Even more preferably, the first surface of the contact layer S2 has a 3D-root mean square roughness (Sq) according to EN ISO 25178 of at least 1.0 μm, preferably of at least 2.0 μm, more preferably of at least 4.0 μm, even more preferably of at least 10.0 μm, most preferably of at least 15.0 μm and a 3D-maximum surface height (Sz) according to EN ISO 25178 of at least 100.0 μm, more preferably of at least 125.0 μm, even more preferably of at least 150.0 μm, most preferably of at least 200.0 μm.

Even more preferably, the first surface of the contact layer S2 has a 3D-average roughness (Sa) according to EN ISO 25178 of at least 10.0 μm, preferably at least 15.0 μm, more preferably at least 20.0 μm, and most preferably at least 25.0 μm and 3D-maximum surface height (Sz) according to EN ISO 25178 of at least 100.0 μm, more preferably of at least 125.0 μm, even more preferably of at least 150.0 μm, most preferably of at least 200.0 μm.

The content of the thermoplastic polymer component P1 in the barrier layer S1 is preferably at least 50.0 wt.-% based on the total weight of the barrier layer. More preferably the content of the thermoplastic polymer component P1 is at least 70.0 wt.-%, most preferably at least 80.0 wt.-%, based on the total weight of the barrier layer S1.

Any kind of thermoplastic polymer component is in principle suitable to be used in the barrier layer. The thermoplastic polymer component P1 preferably comprises at least one polymer selected from the group consisting of ethylene-vinyl acetate copolymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

The barrier layer S1 can comprise additives and processing agents, such as fillers, UV and heat stabilizers, plasticizers, lubricants, biocides, flameproofing agents, antioxidants, pigment, such as for example titanium dioxide or carbon black, dyes, and colorants.

There are no particular restrictions for the thickness of the contact layer S2. However, membranes with contact layer thickness of above 50 mm are not practical in waterproofing applications and contact layers with a thickness of below 50 μm have been found to be difficult to produce with the desired mechanical properties. In particular, the contact layer S2 has a thickness of at least 0.1 mm, preferably of 0.1-75.0 mm, more preferably 0.1-25.0 mm, most preferably 0.1-10.0 mm. Preferably, the contact layer S2 has a thickness of 0.1-50.0 mm, preferably 0.2-10.0 mm, more preferably 0.3-5.0 mm, most preferably 0.4-2.0 mm. The thickness of the contact layer S2 is measured according to EN 1849-2.

It is preferable that the contact layer S2 has a certain flexibility to allow the membrane to be wound into rolls, typically during production, and then easily applied to a surface of a substrate. The inventors of the present invention, however, also have found that membranes with a flexible contact layer have better concrete adhesion strength. Preferably, the contact layer S2 has a shear modulus at a temperature of 30° C. measured according to EN ISO 6721-2:2008 of less than 600 MPa, more preferably less than 200 MPa, and most preferably less than 100 MPa.

The contact layer S2 preferably has a mass per unit area of 100-10000 g/m2, more preferably of 200-6000 g/m2, even more preferably of 300-3000 g/m2.

The mass per unit area is measured according to EN 1849-2 standard.

The density of the contact layer S2 is preferably 0.25-3.00 g/cm$^3$, particularly 0.30-2.75 g/cm$^3$, more preferably 0.35-2.50 g/cm$^3$, even more preferably 0.40-2.00 g/cm$^3$, most preferably 0.50-1.50 g/cm$^3$. The density of the contact layer is measured by using the buoyancy method.

The thickness of the barrier layer S1 is not subjected to any particular restrictions. However, membranes with barrier layer thickness of above 15 mm and below 10 μm are usually not practical in waterproofing applications. The thickness of the barrier layer S1 is preferably in the range of 0.1-10.0 mm, more preferably 0.1-7.5 mm, most preferably 0.1-5.0 mm.

It is preferable that the barrier layer is in the form of a flexible plastic layer. This allows the membrane to be wound into rolls, typically during production, and then easily applied to a surface of a substrate. The inventors of the present invention, however, also have found that increasing the flexibility of the barrier layer has a positive effect to the concrete adhesion strength of the membrane. Preferably, the barrier layer S1 has a shear modulus at a temperature of 30° C. according to EN ISO 6721-2:2008 of less than 600 MPa, more preferably less than 500 MPa, and most preferably less than 250 MPa.

Preferably, wherein the contact layer S2 is weldable with the barrier layer S1. “Weldable” means here that the layers can be homogenously joined to each other by heat welding.

In case the membrane is applied as a waterproofing membrane, the barrier layer S1 should be as waterproof as possible and not to decompose or be mechanically damaged even under prolonged influence of water or moisture.

Typically such barrier layer S1 shows:

- impact resistance of 200-1500 mm measured according to EN 12691: 2005,
- longitudinal and transversal tensile strength of at least 5 MPa at a temperature of 23° C. measured according to DIN ISO 527-3,
- longitudinal and transversal elongation at break of at least 300% at a temperature of 23° C. measured according to DIN ISO 527-3,
- water resistance at 0.6 bar for 24 hours measured according to EN 1928 B, and
- maximum tear strength of at least 100 N measured according to EN 12310-2.

Another embodiment of the membrane of the present invention is shown in FIG. 2, which shows a cross-section of a membrane further comprising a second contact layer S2' having a first surface and a second opposing, wherein at least a portion of the second surface of the barrier layer S1 and the first surface of the contact layer S2' are directly bonded to each other, and wherein the second contact layer S2' comprises a mixture of a solid filler component F' and a thermoplastic polymer component P2'.

The contact layer S2' is typically a sheet-like element having first and second surfaces defined by peripheral edges.

Preferably, the solid filler component F' is dispersed throughout, preferably uniformly, the thermoplastic polymer component P2' in the second contact layer S2'.

The amount of the solid filler component F' can be 10.0-80.0 wt.-%, based on the total weight of the second contact layer S2'. Preferably, the amount of the solid filler component F' is 20.0-75.0 wt.-%, more preferably 30.0-70.0 wt.-%, even more preferably 35.0-65.00 wt.-%, most preferably 40.0-60.0 wt.-%, based on the total weight of the second contact layer S2'.

The solid filler component F' is preferably selected from the group consisting of organic fillers, inert mineral fillers and mineral binders and mixtures thereof. More preferably the solid filler component F' is selected from the group consisting of inert mineral fillers and mineral binders and mixtures thereof.

The solid filler component F preferably comprises a hydraulic binder, in particular cement or cement clinker.

The thermoplastic polymer component P2' is preferably miscible with the thermoplastic polymer component P1. More preferably, the thermoplastic polymer component P2' is weldable with the thermoplastic polymer component P1.

Preferably, the amount of the thermoplastic polymer component P2' is 20.0-85.0 wt.-%, more preferably 30.0-80.0 wt.-%, even more preferably 35.0-75.0 wt.-%, most preferably 40.0-70.0 wt.-%, based on the total weight of the second contact layer S2'.

Any kind of thermoplastic polymer component is in principle suitable to be used in the second contact layer S2'. Preferably, the thermoplastic polymer component P2' comprises at least one polymer selected from the group consisting of ethylene-vinyl acetate copolymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

Preferably the first contact layer S2 and the second contact layer S2' have the same compositions.

Especially when the membrane is used for waterproofing of uneven concrete surfaces, it is necessary to ensure that the membrane is not broken due to the pressure of the concrete casted on the surface of the membrane or due to local stresses applied to the membrane stretched over concave parts of the surface.

Preferably, the membrane has a tensile strength at temperature of 23° C. measured according to standard DIN ISO 527-3 of at least 5 MPa, more preferably at least 10 MPa and a elongation at break at a temperature of 23° C. measured according to standard DIN ISO 527-3 of at least 100%, more preferably of at least 200%, most preferably of at least 300%.

One important characteristic of membranes used in waterproofing applications is the watertightness after infiltration. Watertightness after infiltration describes the ability of the membrane to resist spreading of infiltrated water in the space between the membrane and the waterproofed surface or between the layers of the membrane after leakage in the barrier layer.

The watertightness after infiltration can be measured with a modified watertightness test based on the ASTM 5385 standard measurement method. In the modified watertightness test ASTM 5385M, a hole with a diameter of 10 mm is punched to the membrane, which is then adhered to a concrete slab. The watertightness of the puched membrane is tested with the same kind of apparatus as described in the original ASTM 5385 method. The water pressure inside the test apparatus is increased to a value between 0.25 and 7 bar and the test is continued for a specified time period. At the end of the test, the concrete slab is removed from the test apparatus and at least part of the membrane is peeled off from the concrete surface to determine, how far the water has invaded between the concrete surface and the membrane and/or between different layers of the membrane. In case only a small area, such as a circle with a diameter of 2.50 mm or less, near the hole is affected by water, the membrane is considered to be watertight after infiltration according to ASTM 5385M.

Preferably, the membrane is watertight after infiltration according to ASTM 5385M, when the test is conducted at a pressure of 7 bars and continued for 7 days.

Preferably, the interlayer peel strength of the contact layer S2 from the barrier layer S1 is at least 50 N/50 mm, more preferably at least 100 N/50 mm, most preferably at least 200 N/50 mm.

The term "interlayer peel strength" refers to the average peeling resistance (N) per 50 mm of the contact layer upon peeling the contact layer S1 from one edge at an angle of 180° from the barrier layer S2. The interlayer peel resistance is measured according to the T-peel resistance test according to ISO 1139 standard.

The preferences given above for the solid filler components F and F', for the thermoplastic polymer components P1, P2, P2' apply equally to all aspects of the invention.

In another aspect of the present invention, a method for producing a membrane, as it was described above in detail, is provided. The method for producing a membrane is not particularly limited and any conventional technology used for producing composite membranes comprising polymer based sheets and films can be used.

The membrane can be produced by extruding, calendering, compressing or casting processes.

Preferably, the method for producing a membrane comprises extruding and/or calendering and/or co-extruding a homogenized melt comprising the components of the contact layer S2 and a homogenized melt comprising the components of the barrier layer S1.

The homogenized melt comprising the components of the contact layer S2 can be obtained by melt-homogenizing a composition comprising the solid filler component F and the thermoplastic polymer component P2 in an extruder or kneader. The melt-homogenizing is preferably conducted at a temperature that is higher than the melting point of the thermoplastic polymer component P2, typically at least 20° C. higher, preferably at least 30° C. higher. Preferably, the amount of water in the homogenized melt is less than 1.0 wt.-%, preferably less than 0.5 wt.-%, most preferably less than 0.1 wt.-%.

Preferably, the thermoplastic polymer component P2 is melt-processed in an extruder before the solid filler component F is fed into the extruder through a side feeder. Some or all of the components of the composition can also be first mixed in a mixing device to obtain a dry blend, which is then fed into extruder or kneader. The components of the composition can also be first mixed in a compounding extruder to obtain pellets or granulates, which are then fed into extruder or kneader.

The homogeneous melt comprising the components of the barrier layer S1 can be obtained by melt-homogenizing a composition comprising the thermoplastic polymer component P1 in an extruder or a kneader.

The method for producing a membrane can comprise producing the barrier layer S1 and the contact layer S2 in separate processes after which the layers are bonded to each other by lamination.

The barrier layer S1 and the contact layer S2 can be produced by an extrusion process, which process comprises extruding homogenized melts comprising the components of the barrier and contact layers through a manifold or a flat, annular, slot or cast die, preferably through a manifold or a flat die and quenching the extruded web of material between calender cooling rolls. The thickness of the produced layers can be controlled by die lip adjustment and/or by adjusting the gap size between the cooling rolls. Any conventional extruder apparatus used for producing flat film sheet as described in "Kunststoff Verarbeitung" by Schwarz, Ebeling and Furth, $10^{th}$ Edition 2005, Vogel Buchverlag, paragraph 5.7.2 can be used in the extrusion process.

The barrier layer S1 and the contact layer S2 can also be produced by a calendering process comprising passing the homogenized melts comprising the components of the respective layers between a series of calender rolls, in the course of which the homogenized melt is spread across the width of the rolls, stretched and finally cooled to the form of a film or sheet with defined thickness. The homogenized melt can be fed with an extruder to the top of the calendering section and into the gap between the first and second rolls. Preferably, the calendering section comprises at least four rolls. Any conventional calendering apparatus used for producing films or sheets from thermoplastic materials as described in "Kunststoff Verarbeitung" by Schwarz, Ebeling and Furth, $10^{th}$ Edition 2005, Vogel Buchverlag, chapter 3 can be used in the calendering process.

The produced barrier and contact layers can subsequently be bonded to each other by any conventional lamination technique, preferably by welding under the influence of pressure, pressing with IR radiation, or by pressing between heated calender rolls.

The method for producing a membrane can be a co-extrusion-calendering process, in which process homogenized melts of compositions comprising the components of the barrier layer S1 and the contact layer S2, respectively, are simultaneously extruded as layers on top of each other followed by quenching the extruded double layer material web between calender cooling rolls.

The method for producing a membrane can also be a two-step process comprising a first step, in which a first layer, the barrier layer S1 or the contact layer S2, is produced followed by a second step, in which a homogenized melt comprising the components of the second layer is extruded through a manifold or a flat, annular, slot or cast die, preferably through a manifold or a flat die, on the surface of the first layer. The thus obtained double layer material construction is then cooled between cooling rolls of a calendering apparatus. The first layer can be produced by an extrusion-calendering process or by a calendering process as described above.

According to one embodiment, the method for producing a membrane comprises a first step of extruding a homogenized melt comprising the components of the contact layer S2 through a flat die of a first extrusion apparatus to obtain a contact layer S2 followed by a second step of extruding a homogenized melt comprising the components the barrier layer S1 through a flat die of a second extrusion apparatus to obtain a sheet like mass, which is welded together under the influence of pressure with the incoming contact layer S2 between two calender rolls.

Preferably, the method for producing a membrane comprises extruding a homogenized melt of a composition comprising the components of the contact layer S2 through a manifold or flat die followed by passing the extruded material between calender rolls.

The optimal extrusion temperature depends on the composition of the contact layer S2 and on the desired throughput of the extrusion process. The extrusion temperature is preferably 80-250° C., more preferably 100-240° C., even more preferably 120-220° C., most preferably 140-200° C. The term "extrusion temperature" refers to the temperature of the molten material in the extruder die or manifold. Membranes having a contact layer produced by an extrusion-calendering process with an extrusion temperature within the above described temperature ranges were found to have particularly good concrete adhesion strengths.

Preferably, the extrusion pressure is 20.0-350.0 bar, preferably 30.0-240 bar, more preferably 35.0-200 bar, most preferably 40.0-130.0 bar. The "extrusion pressure" refers to the pressure of the molten material inside the extruder just before the material enters the extruder die or manifold.

The gap size between the calender rolls can be wider than the thickness of the contact layer S2. For example, the gap size between the calender rolls can be 10%, 25%, 50%, or 75% wider than the thickness of the contact layer S2.

Preferably, the method for producing a membrane further comprises extruding a homogenized melt comprising the components of the barrier layer S1 through a manifold or a flat die on the surface of the contact layer S2 followed by passing the thus obtained double layer material web between calender rolls.

According to one embodiment, the method for producing a membrane comprises extruding and/or calendering and/or co-extruding a homogenized melt of a composition comprising the components of a barrier layer S1, a homogenized melt of a composition comprising the components of a first contact layer S2, and a homogenized melt of a composition comprising the components a second contact layer S2'.

The homogenized melt comprising the components of the second contact layer S2' can be obtained by melt-homogenizing a composition comprising the solid filler component F' and the thermoplastic polymer component P2' in an extruder or kneader.

The homogenized melts comprising the aforementioned components of the barrier layer S1 and the contact layers S2 and S2' can further comprise typical additives used in extrusion and calendering processes such as internal lubricants, slip agents, antiblock agents, denest aids, oxidative stabilizers, melt strength enhancers. The homogenized melts can also further comprise other additives such as plasticizers, dyes, colorants, pigments, matting agents, antistatic agents, impact modifiers, and flame retardants.

According to one embodiment, the homogenized melts for the contact layers S2 and S2' comprise, in addition to the solid filler component F/F' and the at least thermoplastic polymer component P2/P2', at least one chemical or physical foaming agent and optionally at least one activator for the foaming agent. Examples of suitable chemical foaming agents include azodicarbonamide, azobisisobutyronitrile, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl semicarbazide, sodium bicarbonate, ammonium carbonate, ammonium bicarbonate, potassium bicarbonate, diazoaminobenzene, diazoaminotoluene, hydrazodicarbonamide, diazoisobutyronitrile, barium azodicarboxylate and 5-hydroxytetrazole. Preferably, the foaming agent is sodium bicarbonate.

The method for producing a membrane can further comprise a post-treatment step such as brushing and/or sand blasting and/or plasma treatment, in particular air plasma treatment, to optimize the surface properties of the produced contact layer. The final product is preferably stored in the form of rolls.

In another aspect of the present invention a method for waterproofing a substrate is provided. The substrate can be any structural or civil engineering structure, which is to be sealed against moisture and water, such as a hardened concrete structure or a subsurface. The surface of the substrate can orientated horizontally or not.

The method for waterproofing a substrate comprises steps of applying a membrane according to the present invention to a surface of a substrate such that the second surface of the barrier layer S1 is directed against the surface of the substrate, casting a fresh cementitious composition on the first surface of the contact layer S2, and hardening the fresh cementitious composition.

Preferably, the fresh cementitious composition is a fresh concrete composition.

The casted cementitious composition after hardening can be part of a structure, in particular, an above-ground or underground structure, for example a building, garage, tunnel, landfill, water retention, pond, dike or an element for use in pre-fabricated constructions.

According to one embodiment, the method for waterproofing a substrate comprises steps of applying a layer of adhesive on the surface of the substrate and covering the layer of the adhesive with a membrane of the present invention such that the second surface of the second contact layer S2' is brought in contact with the layer of adhesive, casting a fresh cementitious composition on the first surface of the contact layer S2, and hardening the layer of adhesive and the fresh cementitious composition.

The adhesive can be a fresh cementitious composition or a synthetic resin based adhesive, such as epoxy based two-component adhesive or EVA-based adhesive, preferably a fresh cementitious composition.

The casted cementitious composition after hardening can be part of a structure, in particular, an above-ground or underground structure, for example a building, garage, tunnel, landfill, water retention, pond, dike or an element for use in pre-fabricated constructions.

In another aspect of the present invention a waterproofed construction for waterproofing a substrate against water penetration is provided. The waterproofed construction comprises a layer of concrete and a membrane according to the present invention arranged between the surface of the substrate and the layer of concrete such that the second surface of the barrier layer S1 is directed against the surface of the substrate and the first surface of the contact layer S2 is fully bonded to the surfaced of the layer of concrete.

The term "fully bonded" refers to two surfaces being adhesively joined over the full surface.

The substrate can be any structural or civil engineering structure, which is to be sealed against moisture and water, such as a hardened concrete structure or a subsurface.

According to one embodiment, the waterproofed construction for waterproofing a substrate against water penetration comprises a layer of concrete and a membrane according to the present invention arranged between the surface of the substrate and the layer of concrete such that the second surface of the second contact layer S2' is directed against the surface of the substrate and the first surface of the contact layer S2 is fully bonded to the surface of the layer of concrete.

The substrate can be any structural or civil engineering structure, which is to be sealed against moisture and water, such as a hardened concrete structure or a subsurface.

In another aspect of the present invention a method for sealing a substrate against water penetration is provided. The method for sealing comprises steps of applying a layer of adhesive on the surface of the substrate, covering the layer of the adhesive with a membrane of the present invention such that the first surface of the contact layer S2 or the second surface of the second contact layer S2' is brought in contact with the layer of adhesive, and hardening the layer of adhesive.

The adhesive can be a fresh cementitious composition or a synthetic resin based adhesive, such as epoxy based two-component adhesive or EVA-based adhesive, preferably a fresh cementitious composition, particularly a fresh concrete or shotcrete composition.

According to one embodiment, the method for sealing a substrate against water penetration comprises steps of applying a layer of adhesive on the first surface of a contact layer S2 or on the second surface of a second contact layer S2', covering surface of the substrate with the membrane of the present invention such that the layer of adhesive is brought in contact with surface of the substrate, and hardening the layer of adhesive.

The adhesive can be a fresh cementitious composition or a synthetic resin based adhesive, such as epoxy based two-component adhesive or EVA-based adhesive, preferably a fresh cementitious composition, particularly a fresh concrete or shotcrete composition.

In another aspect of the present invention a sealed construction for sealing a substrate against water penetration is provided. The sealed construction comprises a membrane according to the present invention and a layer of adhesive arranged between a surface of the substrate and the membrane such that the first surface of the first contact layer S2 or the second surface of the second contact layer S2' is bonded to the surface of the substrate with the layer of adhesive.

The adhesive can be a fresh cementitious composition or a synthetic resin based adhesive such as epoxy based two-component adhesive or EVA-based adhesive, preferably a fresh cementitious composition, particularly a fresh concrete or shotcrete composition.

EXAMPLES

The materials shown in Table 1 were used in the examples.

TABLE 1

Materials used in the experiments

| Trade name | Composition | Provider |
|---|---|---|
| Evatane 18-150 | EVA copolymer with 18 wt.-% vinyl acetate | Arkema |
| Elvax 260A | EVA copolymer with 28 wt.-% vinyl acetate | DuPont |

TABLE 1-continued

| Materials used in the experiments | | |
|---|---|---|
| Trade name | Composition | Provider |
| Levapren 400 | EVA copolymer with 40 wt.-% vinyl acetate | Lanxess |
| Levapren 700 | EVA copolymer with 70 wt.-% vinyl acetate | Lanxess |
| Levapren 900 | EVA copolymer with 90 wt.-% vinyl acetate | Lanxess |
| Elvaloy AC 2116 | EEA copolymer with 16 wt.-% acrylic acid | DuPont |
| Vistamax 6202 | PP-PE copolymer with 15 wt-.% polyethylene | Exxon Mobile |
| Holcim Optimo 4 | CEM II/B-M (T-LL) 42.5 N SN EN 197-1 cement | LaFargeHolcim |

[a]EVA, ethylene vinyl acetate copolymer
[b]EEA, ethylene acrylic acid copolymer

Example 1

Preparation of the Example Membranes

The example membranes EX1-EX9 each comprising a barrier layer and a contact layer were produced with a laboratory scale extrusion-calendering apparatus comprising a flat die and set of water-cooled calender rolls. The layers were extruded with a twin screw extruder (Berstorff GmbH).

For each example membrane (EX), a contact layer (E) was first produced with the extrusion-calendering apparatus after which a barrier layer was extruded and bonded on one surface of the contact layer using the same extrusion-calendering apparatus. A polyethylene-based thermoplastic membrane (WT 1210 HE available from Sika) was used as a barrier layer in all example membranes EX1-EX9.

The extruder part of the apparatus was equipped with a flat die and the melted compositions of the contact layers were extruded without using a die lip. The polymer component of the contact layer was first melt-processed in the extruder at a temperature, which is approximately 30° C. above the melting temperature of the polymer component before the solid filler component was fed into the extruder through a side feeder. The produced contact layers had a thickness of approximately 1.50 mm while the thickness of the barrier layer was approximately 0.5 mm. A melted composition consisting of the constituents of the barrier layer was extruded with a flat die on the surface of each contact layer and the layers were pressed together and cooled between calender cooling rolls.

The operating conditions of the extruder-calender apparatus during producing the example membranes are presented in Table 2 and the compositions of the contact layers (E) of the example membranes EX1-EX9 are presented in Table 3. The extrusion temperature and pressure were measured at a point, where the melted mass entered the flat die. The temperature of the cooling rolls was approximately 20° C. during the production period.

TABLE 2

| Operating conditions of the extrusion process | | | | | |
|---|---|---|---|---|---|
| Contact layer | Extrusion pressure [bar] | Extrusion temperature [° C.] | Extrusion flux [kg/h] | Roller gap [mm] | Roller speed [m/min] |
| E1 | 72 | 160 | 12 | 3.00 | 0.49 |
| E2 | 53 | 160 | 12 | 3.00 | 0.52 |
| E3 | 83 | 160 | 12 | 3.00 | 0.5 |

TABLE 2-continued

| Operating conditions of the extrusion process | | | | | |
|---|---|---|---|---|---|
| Contact layer | Extrusion pressure [bar] | Extrusion temperature [° C.] | Extrusion flux [kg/h] | Roller gap [mm] | Roller speed [m/min] |
| E4 | 77 | 160 | 12 | 3.00 | 0.47 |
| E5 | 65 | 160 | 12 | 3.00 | 0.51 |
| E6 | 79 | 160 | 12 | 3.00 | 0.53 |
| E7 | 59 | 160 | 12 | 3.00 | 0.5 |
| E8 | 59 | 160 | 13 | 3.00 | 0.5 |
| E9 | 58 | 160 | 13 | 3.00 | 0.51 |
| Barrier layer | 61 | 160 | 10 | 1.80 | 0.78 |

Preparation of Concrete Test Specimen

Three sample membranes with a dimension of 200 mm (length)×50 mm (width) were cut from each of the example membranes EX1-EX9 produced as described above. The sample membranes were placed into formworks having a dimension of 200 mm (length)×50 mm (width)×30 mm (height) with the contact layer facing upwards and with the barrier layer against the bottom of the formwork.

One edge of each sample membrane on the side of the contact layer was covered with an adhesive tape having a length of 50 mm and width coinciding with the width of the membrane sample to prevent the adhesion to the hardened concrete. The adhesive tapes were used to provide easier installation of the test specimens to the peel resistance testing apparatus.

For the preparation of concrete specimens a batch of fresh concrete formulation was prepared. The fresh concrete formulation was obtained by mixing 8.9900 kg of a concrete dry batch of type MC 0.45 conforming to EN 1766 standard, 0.7553 kg of water and 0.0202 kg of Sikament-12S for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Sikament-12S the concrete dry batch was homogenized for five minutes in a tumbling mixer.

The formworks containing the sample membranes were subsequently filled with the fresh concrete formulation and vibrated for two minutes to release the entrapped air. After hardening for one day the test concrete specimens were stripped from the formworks and stored under standard atmosphere (air temperature 23° C., relative air humidity 50%) before measuring the peel resistances.

Measurement of Peel Resistances

The measurement of peel resistances of sample membranes from hardened concrete specimen was conducted in accordance with the procedure laid out in the standard DIN EN 1372:2015-06. A Zwick Roell AllroundLine Z010 material testing apparatus equipped with a Zwick Roell 90°-peeling device (type number 316237) was used for conducting the peel resistance measurements.

For the peel resistance measurements, a concrete specimen was clamped with the upper grip of the material testing apparatus for a length of 10 mm at the end of the concrete specimen comprising the taped section of the sample membrane. Following, the sample membrane was peeled off from the surface of the concrete specimen at a peeling angle of 90° and at a constant cross beam speed of 100 mm/min. During the measurements the distance of the rolls was approximately 570 mm. The peeling of the sample membrane was continued until a length of approximately 140 mm of the sample membrane was peeled off from the surface of the concrete specimen. The values for peel resistance were calculated as average peel force per width of the sample membrane [N/50 mm] during peeling over a length of approximately 70 mm thus excluding the first and last quarter of the total peeling length from the calculation.

The average peel resistance values for the example membranes EX1-EX9 presented in Table 3 have been calculated as an average of measured values obtained with three sample membranes cut from the same example membrane.

TABLE 3

Compositions of the contact layers and measured peel resistances

| | Contact layer | | | | | | | | |
|---|---|---|---|---|---|---|---|---|---|
| | EX1 | EX2 | EX3 | EX4 | EX5 | EX6 | EX7 | EX8 | EX9 |
| Polymer component | | | | | | | | | |
| Elvax 260 A [wt.-%] | 10.5 | | | 10.5 | 10.5 | | | 25 | |
| Evatane 18-150 [wt.-%] | | 10.5 | | | | | 10.5 | | |
| Elvaloy AC 2116 [wt.-%] | | | 10.5 | | | | | | |
| Levapren 400 [wt.-%] | 39.5 | 39.5 | 39.5 | | | 50 | | | |
| Levapren 700 [wt.-%] | | | | 39.5 | | | 39.5 | | |
| Levapren 900 [wt.-%] | | | | | 39.5 | | | 25 | 25 |
| Vistamaxx 6202 [wt.-%] | | | | | | | | | 25 |
| Solid filler component | | | | | | | | | |
| Holcim optimo 4 [wt.-%] | 50 | 50 | 50 | 50 | 50 | 50 | 50 | 50 | 50 |
| Peel resistance | | | | | | | | | |
| 1 day [N/50 mm] | 14.9 | 27.8 | 15.2 | 54.7 | 97.2 | 44.4 | 75.8 | 64.1 | 36.1 |
| 7 days [N/50 mm] | 86.7 | 83.3 | 100.3 | 82.7 | 152.9 | 109.2 | 104.5 | 136.0 | 54.4 |
| 28 days [N/50 mm] | 105.8 | 105.2 | 108.1 | 92.4 | 169.1 | 124.0 | 124.2 | 134.6 | 98.2 |

Example 2

3D-average roughness (Sa), 3D-root mean square roughness (Sq), and 3D-maximum surface height (Sz) according to EN ISO 25178 standard were determined for the surfaces of contact layers of the example membranes EX10-EX15.

The example membranes were produced as described above in Example 1 by using an extruder-calender apparatus. A polyethylene-based thermoplastic membrane (WT 1210 HE available form Sika) was used as a barrier layer in all example membranes. The operating conditions of the extruder-calender apparatus during producing the example membranes are presented in Table 4 and the compositions of the contact layers (E) of the example membranes EX10-EX15 are presented in Table 5. The extrusion temperature is the temperature of the melted mass in the flat die and the extrusion pressure was measured at a point, where the melted mass entered the flat die. The temperature of the cooling rolls was approximately 20° C. during the production period. The peel resistances form hardened concrete specimens were determined as described above in Example 1.

For measuring the surface geometry of the contact layers, a sample membrane with a size of 100 mm (length)×100 mm (width) was cut from each example membrane and adhered to an aluminum sheet having a dimension of 100 mm (length)×100 mm (width)×5 mm (height), with the contact layer facing upwards, to ensure a completely planar lying of the sample. A double-sided adhesive tape was used in attaching the sample to the aluminum sheet.

The surface geometry of each contact layer was measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 cm2 in the x-y-direction. In conducting the surface geometry measurements, the top and bottom limit of confocal acquisition in z-direction was adjusted manually in the laser modus after adjusting the coarse and fine focus in the live color image modus.

The 3D-surface roughness parameters were calculated from the measured surface geometry with the attached Olympus LEXT OLS4000 Application Version 2.1.3 software. The 3D-surface roughness parameters were calculated by using unfiltered primary dataset obtained from the optical measurements without using any of the cutoff lengths As, Ac, or $\lambda_f$. The 3D-surface roughness parameters shown in Table 5 have been obtained as average from at least two measurements conducted at different locations on the surface of a contact layer of each sample membrane.

TABLE 4

Operating conditions of the extrusion process

| Contact layer | Extrusion pressure [bar] | Extrusion temperature [° C.] | Extrusion flux [kg/h] | Roller gap [mm] |
|---|---|---|---|---|
| E10 | 56 | 175 | 13 | 2.6 |
| E11 | 94 | 190 | 14 | 3.0 |
| E12 | 57 | 220 | 16 | 3.0 |
| E13 | 93 | 185 | 16 | 3.0 |
| Barrier layer | 61 | 160 | 10 | 1.8 |

TABLE 5

Compositions, peel resistances and 3D-roughness parameters

| Contact layer | EX10 | EX11 | EX12 | EX13 |
|---|---|---|---|---|
| Polymer component | | | | |
| Elvax 260 A [wt.-%] | 13.1 | 13.1 | 13.1 | 13.1 |
| Levapren 400 [wt.-%] | 12.3 | 12.3 | 12.3 | 12.3 |
| *Additives | 12.9 | 12.9 | 12.9 | 12.9 |

TABLE 5-continued

| Compositions, peel resistances and 3D-roughness parameters | | | | |
|---|---|---|---|---|
| Contact layer | EX10 | EX11 | EX12 | EX13 |
| Solid filler component | | | | |
| Holcim optimo 4 [wt.-%] | 60 | 60 | 60 | 60 |
| 3D-surface roughness | | | | |
| Sa [μm] | 35.8 | 111.0 | 115.5 | 126.1 |
| Sq [μm] | 44.1 | 142.1 | 146.5 | 160.7 |
| Sz [μm] | 524.3 | 1265.4 | 978.0 | 1118.3 |
| Peel resistance | | | | |
| 28 days [N/50 mm] | 68.0 | 75.0 | 79.8 | 91.0 |

*Paraloid KM370, Antioxidant 1010, Loxiol 93P, Tinuvin 783FDL

The invention claimed is:

1. A membrane comprising a barrier layer S1 having a first and a second opposing surface and a contact layer S2 having a first and a second opposing surface, wherein at least a portion of the first surface of the barrier layer S1 and the second surface of the contact layer S2 are directly bonded to each other, the barrier layer S1 has a thickness that is in a range of 0.1-10.0 mm, the barrier layer S1 comprises a thermoplastic polymer component P1, the contact layer S2 comprises a mixture including a solid filler component F and a thermoplastic polymer component P2 consisting of:

(i) a first ethylene-vinyl acetate co-polymer having a content of vinyl acetate unit in a range of 18.0-30 wt.-%, (ii) a second ethylene-vinyl acetate co-polymer having a content of vinyl acetate unit in a range of 70.0-90.0 wt.-%, and (iii) optional additives, and the amount of the solid filler component F is in a range of 10.0-90.0 wt.-%, based on the total weight of the contact layer S2.

2. The membrane according to claim 1, wherein the contact layer S2 comprises not more than 2.5 wt.-% of hydrated mineral binders, based on the total weight of the contact layer S2.

3. The membrane according to claim 1, wherein the thermoplastic polymer component P2 has a melting point that is in a range of 25-250° C., as determined according to ISO 11357.

4. The membrane according to claim 1, wherein the amount of the solid filler component F is in a range of 15.0-80.0 wt.-%, based on the total weight of the contact layer S2.

5. The membrane according to claim 1, wherein the membrane has a concrete adhesion strength that is at least 10 N/50 mm, determined by a method comprising peeling the membrane from a surface of a concrete specimen at a peeling angle of 90° using a material testing apparatus equipped with a peeling device or a testing apparatus fulfilling requirements of DIN EN 1372 standard.

6. The membrane according to claim 5, wherein the concrete adhesion strength is in a range of 10 N/50 mm to 400 N/50 mm.

7. The membrane according to claim 1, wherein the solid filler component F is selected from the group consisting of organic fillers, inert mineral fillers, mineral binders, and mixtures thereof.

8. The membrane according to claim 1, wherein the solid filler component F comprises at least one mineral binder selected from the group consisting of hydraulic binders, non-hydraulic binders, latent hydraulic binders, and pozzolanic binders, and mixtures thereof.

9. The membrane according to claim 1, wherein the solid filler component F comprises hydraulic binders.

10. The membrane according to claim 1, wherein the amount of the thermoplastic polymer component P2 is in a range of 10.0-90.0 wt.-%, based on the total weight of the contact layer S2.

11. The membrane according to claim 1, wherein the thermoplastic polymer component P1 is miscible with the thermoplastic polymer component P2.

12. The membrane according to claim 1, wherein the contact layer S2 has a thickness that is in a range of 0.1-50.0 mm.

13. The membrane according to claim 1, wherein the contact layer S2 has a mass per unit area that is in a range of 100-10000 g/m$^2$.

14. The membrane according to claim 1, wherein the barrier layer S1 is configured to be waterproof.

15. The membrane according to claim 1, further comprising a second contact layer S2' having a first surface and a second opposing surface, wherein at least a portion of the second surface of the barrier layer S1 and the first surface of the contact layer S2' are directly bonded to each other, and the second contact layer S2' comprises a mixture of a solid filler component F' and a thermoplastic polymer component P2'.

16. The membrane according to claim 1, wherein the contact layer S2 has a shear modulus at a temperature of 30° C. measured according to EN ISO 6721-2:2008 of less than 600 MPa.

17. A waterproofed construction comprising a layer of concrete and the membrane according to claim 1 arranged between a surface of a substrate and the layer of concrete such that the second surface of the barrier layer S1 is directed against the surface of the substrate and the first surface of the contact layer S2 is fully bonded to the layer of concrete.

18. A sealed construction comprising the membrane according to claim 1 and a layer of adhesive arranged between a surface of a substrate and the membrane such that the first surface of the contact layer S2 is bonded to the surface of the substrate with the layer of adhesive.

19. A method for producing the membrane according to claim 1 comprising extruding and/or calendering and/or co-extruding a homogenized melt comprising the thermoplastic polymer component P1 of the barrier layer S1, and a homogenized melt comprising the mixture of the contact layer S2.

20. A method for waterproofing a substrate, the method comprising applying the membrane according to claim 1 to a surface of a substrate such that the second surface of the barrier layer S1 is directed against the surface of the substrate, casting a fresh cementitious composition on the first surface of the contact layer S2, and hardening the fresh cementitious composition.

21. A method for sealing a substrate against water penetration, the method comprising applying a layer of adhesive on the surface of the substrate, covering the layer of the adhesive with the membrane according to claim 1 such that the first surface of the contact layer S2 is brought in contact with the layer of adhesive, and hardening the layer of adhesive.

* * * * *